United States Patent
Fujii et al.

(10) Patent No.: US 11,130,194 B2
(45) Date of Patent: Sep. 28, 2021

(54) FRICTION STIR WELDING TOOL MEMBER, FRICTION STIR WELDING APPARATUS USING THE SAME, AND FRICTION STIR WELDING METHOD

(71) Applicants: OSAKA UNIVERSITY, Suita (JP); TOSHIBA MATERIALS CO., LTD., Yokohama (JP)

(72) Inventors: Hidetoshi Fujii, Ibaraki Osaka (JP); Yoshiaki Morisada, Ibaraki Osaka (JP); Kai Funaki, Kanagawa (JP); Isao Ikeda, Kanagawa (JP); Yutaka Abe, Kanagawa (JP); Masahiro Kato, Kanagawa (JP)

(73) Assignees: OSAKA UNIVERSITY, Suita (JP); TOSHIBA MATERIALS CO., LTD., Yokohama (JP)

( * ) Notice: Subject to any disclaimer, the term of this patent is extended or adjusted under 35 U.S.C. 154(b) by 270 days.

(21) Appl. No.: 16/324,110

(22) PCT Filed: Aug. 4, 2017

(86) PCT No.: PCT/JP2017/028458
§ 371 (c)(1),
(2) Date: Feb. 7, 2019

(87) PCT Pub. No.: WO2018/030309
PCT Pub. Date: Feb. 15, 2018

(65) Prior Publication Data
US 2019/0210149 A1    Jul. 11, 2019

(30) Foreign Application Priority Data
Aug. 9, 2016 (JP) .............................. JP2016-156384

(51) Int. Cl.
*B23K 20/00* (2006.01)
*B23K 20/12* (2006.01)
(Continued)

(52) U.S. Cl.
CPC ............ *B23K 20/127* (2013.01); *B23K 20/12* (2013.01); *C04B 35/584* (2013.01); *C04B 37/02* (2013.01)

(58) Field of Classification Search
CPC .. B23K 20/1255; B23K 20/12; B23K 20/122; B23K 20/1245; B23K 20/125; B23K 20/127; B23K 2101/20; B23K 26/356
See application file for complete search history.

(56) References Cited

U.S. PATENT DOCUMENTS

| | | | |
|---|---|---|---|
| 2004/0191535 A1* | 9/2004 | Komatsu | C04B 35/6303 428/446 |
| 2013/0087604 A1* | 4/2013 | Moriguchi | C23C 14/325 228/112.1 |

(Continued)

FOREIGN PATENT DOCUMENTS

| | | |
|---|---|---|
| EP | 2835209 A1 | 2/2015 |
| JP | 2001-205454 A | 7/2001 |

(Continued)

OTHER PUBLICATIONS

AZO Materials (Properties: Silicon Nitride (Si3N4) Properties and Applications (azom.com), Apr. 6, 2016 (Year: 2016).*

*Primary Examiner* — Erin B Saad
(74) *Attorney, Agent, or Firm* — Foley & Lardner LLP (57) ABSTRACT

The friction stir welding tool member according to the present invention is made of a ceramic member in which a shoulder portion and a probe portion are integrally formed, wherein a root portion of the probe portion and an end portion of the shoulder portion have a curved surface shape; and the friction stir welding tool member has a ratio (R1/D)

(Continued)

of 0.02 or more and 0.20 or less when a curvature radius of the end portion of the shoulder portion is defined as R1 (mm) and an outer diameter of the shoulder portion is defined as D (mm). In addition, the ceramic member is preferably made of a silicon nitride sintered body having a Vickers hardness of 1400 HV1 or more. According to the above-described configuration, a friction stir welding tool member having excellent durability can be provided.

12 Claims, 2 Drawing Sheets

(51) Int. Cl.
*C04B 35/584* (2006.01)
*C04B 37/02* (2006.01)

(56) References Cited

U.S. PATENT DOCUMENTS

| | | | |
|---|---|---|---|
| 2016/0199934 A1* | 7/2016 | Maruko | B23K 20/1255 228/2.3 |
| 2017/0136571 A1 | 5/2017 | Utsumi | |
| 2017/0297141 A1 | 10/2017 | Ikeda et al. | |

FOREIGN PATENT DOCUMENTS

| | | |
|---|---|---|
| JP | 2003-245783 A | 9/2003 |
| JP | 2010-036247 A | 2/2010 |
| JP | 2011-098842 A | 5/2011 |
| JP | 2013-035009 A | 2/2013 |
| JP | 2016-064419 A | 4/2016 |
| WO | WO-2016/006378 A1 | 1/2016 |
| WO | WO-2016/047376 A1 | 3/2016 |

* cited by examiner

FRICTION STIR WELDING TOOL MEMBER, FRICTION STIR WELDING APPARATUS USING THE SAME, AND FRICTION STIR WELDING METHOD

TECHNICAL FIELD

The embodiments relate to a friction stir welding tool member, a friction stir welding apparatus using the same, and a friction stir welding method.

BACKGROUND ART

The friction stir welding (FSW) is a welding method for integrating plural members under frictional heat by pressing a welding tool member called a probe against the plural members while the welding tool member is being rotated at a high speed. In the friction stir welding method, a member (i.e., base member) is softened by the frictional heat, the periphery of the welding portion is subjected to plastic flow by the rotation torque of the probe, and thus the plural members (i.e., the base member and its mating member) can be integrated. Accordingly, the friction stir welding can be said to be one type of solid-phase welding.

The friction stir welding is a solid-phase welding and thus heat input to the welding portion is small. Hence, in the friction stir welding, the degree of softening and/or distortion of a welding object is small. Since any bonding brazing material is not used, cost reduction is expected.

The welding tool member used in the friction stir welding is required to have both of the wear resistance capable of withstanding the high-speed rotation and the heat resistance capable of withstanding the frictional heat.

As a conventional welding tool member, Japanese Patent Laid-Open No. 2011-98842 (Patent Document 1) discloses a welding tool member using a silicon nitride sintered body. The silicon nitride sintered body of Patent Document 1 includes cBN (cubic boron nitride), SiC (silicon carbide), and TiN (titanium nitride) in a content as large as 20 vol. %.

Although the welding tool member formed of the silicon nitride sintered body disclosed in Patent Document 1 is improved in wear resistance to a certain degree, further improvement has been demanded. In the case of the welding tool member in which cBN (cubic boron nitride), SiC (silicon carbide), and TiN (titanium nitride) are added in a content as large as 20 vol % as disclosed in Patent Document 1, it has been revealed to have difficult sinterability and to be unable to obtain any dense sintered body, and thus the wear resistance of the silicon nitride sintered body becomes insufficient.

In the invention disclosed in International Publication No. WO2016/047376 (Patent Document 2), a friction stir welding tool member made of a silicon nitride sintered body in which the amount of sintering aid is set to 15% by mass or less has been developed. Reduction in amount of sintering aid has been realized by using a predetermined combination of sintering aids.

PRIOR ART DOCUMENTS

Patent Document

Patent Document 1: Japanese Patent Laid-Open No. 2011-98842
Patent Document 2: International Publication No. WO2016/047376

SUMMARY OF THE INVENTION

Problems to be Solved by the Invention

Patent Document 2 discloses a silicon nitride sintered body having satisfactory values for both Vickers hardness and a fracture toughness value. As a result, a performance of the silicon nitride sintered body is improved as a friction stir welding tool member. However, the performance was not satisfactory from the viewpoint of long-term life span. As a result of examining this cause, it turned out that there was a cause in the shape of the shoulder portion. In FIG. 2 of Patent Document 2, a tool member having a shape with a rectangular cross-section is disclosed. In such a structure, the shoulder portion is brought into contact with a material to be bonded during the friction stir welding, which results in the problem that the shoulder portion is chipped and the welding function is lost.

The friction stir welding tool member according to the embodiments has been completed in order to solve the above-described problems.

Means for Solving the Problems

The friction stir welding tool member according to an embodiment is made of a ceramic member in which a shoulder portion and a probe portion are integrally formed, wherein a root portion of the probe portion and an end portion of the shoulder portion have a curved surface shape; and the friction stir welding tool member has R1/D of 0.02 or more and 0.20 or less when a curvature radius of the end portion of the shoulder portion is defined as R1 (mm) and an outer diameter of the shoulder portion is defined as D (mm).

DESCRIPTION OF EMBODIMENTS

The friction stir welding tool member according to an embodiment is made of a ceramic member in which a shoulder portion and a probe portion are integrally formed, wherein a root portion of the probe portion and an end portion of the shoulder portion have a curved surface shape; and the friction stir welding tool member has a ratio (R1/D) of 0.02 or more and 0.20 or less when a curvature radius of the end portion of the shoulder portion is defined as R1 (mm) and an outer diameter of the shoulder portion is defined as D (mm).

Figure 1:
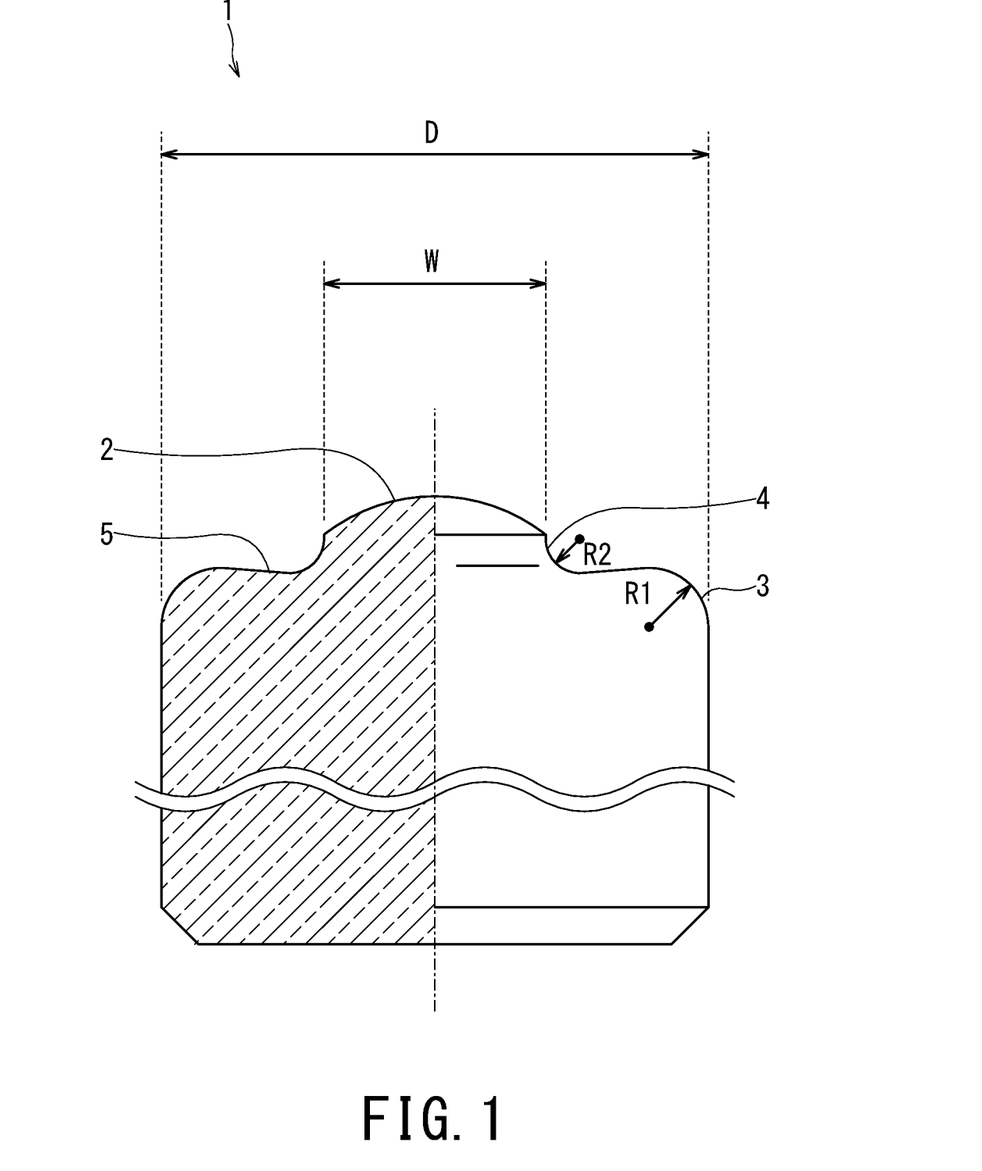
FIG. 1 is a half cross-sectional view illustrating one configuration of a friction stir welding tool member according to one embodiment.

FIG. 1 is a half cross-sectional view illustrating one configuration of the friction stir welding tool member according to the embodiment. In the figure, the reference sign 1 denotes a friction stir welding tool member, the reference sign 2 denotes a tip portion of a probe portion, the reference sign 3 denotes an end portion of a shoulder portion, the reference sign 4 denotes a root portion of a probe portion, and the reference sign 5 denotes an inclined surface, the reference sign W denotes the outer diameter of the probe portion, and the reference sign D denotes the outer diameter of the shoulder portion.

The friction stir welding tool member 1 is composed of a ceramic member in which the shoulder portion and the probe portion are integrally formed. The integration means a state in which the shoulder portion and the probe portion are formed of one piece of a ceramic sintered body. For instance, the above-described integration excludes a configuration in which the shoulder portion and the probe portion are bonded by a bonding brazing material. Similarly, the above-described integration excludes a configuration in which the shoulder portion and the probe portion are interdigitated (fitted) with each other.

When the shoulder portion and the probe portion are formed in the integrated structure so as to form one piece of a ceramic sintered body, the strength of the tool member can be enhanced.

In addition, each of the root portion of the probe portion and the end portion of the shoulder portion has a curved surface shape. The probe portion is a convex portion at the tip of the tool member. The friction stir welding is performed by pressing the convex portion (probe portion) against a member to be welded. The root of this convex portion is the root portion. When the root portion is formed into a curved surface shape, the strength of the root portion can be improved. When the angle of the root portion is a right angle, the probe portion is easily broken in the case of rotating at a high speed like a tool member. Concentration of stress can be prevented by providing the curved surface shape to the root portion.

Further, the end portion of the shoulder portion is also characterized by having a curved surface shape. When the probe portion is pressed against the member to be welded during the friction stir welding, the shoulder portion is brought into contact with the member to be welded. When the end portion of the shoulder portion is a square shape, the contact between the end portion and the member to be welded is in line contact state. In the line contact, since the stress is excessively applied to the end portion of the shoulder portion, the end portion is liable to be easily broken. Contrastively, when the end portion of the shoulder portion is formed to have a curved shape, the contact between the end portion of the shoulder portion and the member to be welded can be made into a surface contact, and consequently, breakage of the shoulder portion can be effectively suppressed.

In addition, when the curvature radius of the end portion of the shoulder portion is defined as R1 (mm) and the outer diameter of the shoulder portion is defined as D (mm), the ratio (R1/D) is set within the range of 0.02 or more and 0.20 or less.

The curvature radius R1 of the end portion of the shoulder portion is assumed to be obtained by observing the cross-section of the tool member or image analysis (image analysis of the tool member (solid) as it is). Further, the outer diameter D of the shoulder portion is assumed to be the outer diameter of the tool member (i.e., ceramic member). When the probe portion side is viewed from the front, the longest diameter of the shoulder portion is defined as the outer diameter D of the tool member.

The fact that the ratio (R1/D) is 0.02 or more and 0.20 or less means that the curvature radius R1 is within the range of 2 to 20% with respect to the outer diameter D (mm). The presence of the shoulder portion improves the strength of the tool member. Further, when the shoulder portion comes into contact with the member to be joined (welded), whereby the stirring power is improved.

In the shape without the shoulder portion, the tool member has an elongated shape of only the probe portion. In the case of an elongated shape, the tool member is easily broken. When the shoulder portion is present, the strength of the tool member can be improved. On the other hand, when the end portion of the shoulder portion is square, the shoulder portion is liable to be broken.

When the ratio (R1/D) is set to 0.02 or more and 0.20 or less, it is possible to improve both the strength of the entire tool member and the strength of the end portion of the shoulder portion. When R1/D is less than 0.02, the curvature radius R1 of the end portion of the shoulder portion becomes too small and the effect of making the curved surface shape is insufficient. Additionally, when R1/D exceeds 0.20, the curvature radius of R1 increases. When the curvature radius R1 is too large, the shoulder portion has an elongated shape and the strength of the tool member decreases. Thus, the ratio (R1/D) is preferably in the range of 0.02 or more and 0.20 or less, and is more preferably in the range of 0.05 or more and 0.15 or less.

The curvature radius R1 of the end portion of the shoulder portion is preferably 0.5 mm or more. When the curvature radius R1 is less than 0.5 mm, it is difficult to control the ratio (R1/D) within the range of 0.02 to 0.20. In particular, in order to obtain such a shape with the use of a ceramic member, it is necessary to thin the outer diameter D of the shoulder portion and such processing is difficult. Although the upper limit of the curvature radius R1 is not particularly limited, the curvature radius R1 is preferably 4 mm or less. When the curvature radius R1 is larger than 4 mm, the shoulder portion becomes a low-shoulder shape. The presence of the shoulder portion makes it possible to stabilize the depth at which the probe portion enters into the member to be welded during the friction stir welding. When the shoulder portion has a low-shoulder shape, it becomes difficult to stabilize the depth at which the probe portion enters into the member to be welded. Thus, the curvature radius R1 of the end portion of the shoulder portion is preferably set to 0.5 mm or more and 4 mm or less, and is more preferably 1.2 mm or more and 2.3 mm or less.

When the curvature radius of the root portion of the probe portion is defined as R2 (mm), R2 is preferably set to 0.1 mm or more. When the curvature radius R2 is less than 0.1 mm, the root portion of the probe portion has a shape close to a right angle and the structural strength of the probe portion is reduced. The shape of the root portion may be a gently curved surface shape like the foot shape of Mt. Fuji. By setting the curvature radius R2 to 0.1 mm or more, it is possible to improve the structural strength of the root portion, which leads to improvement in stirring force by the probe portion.

Figure 2:
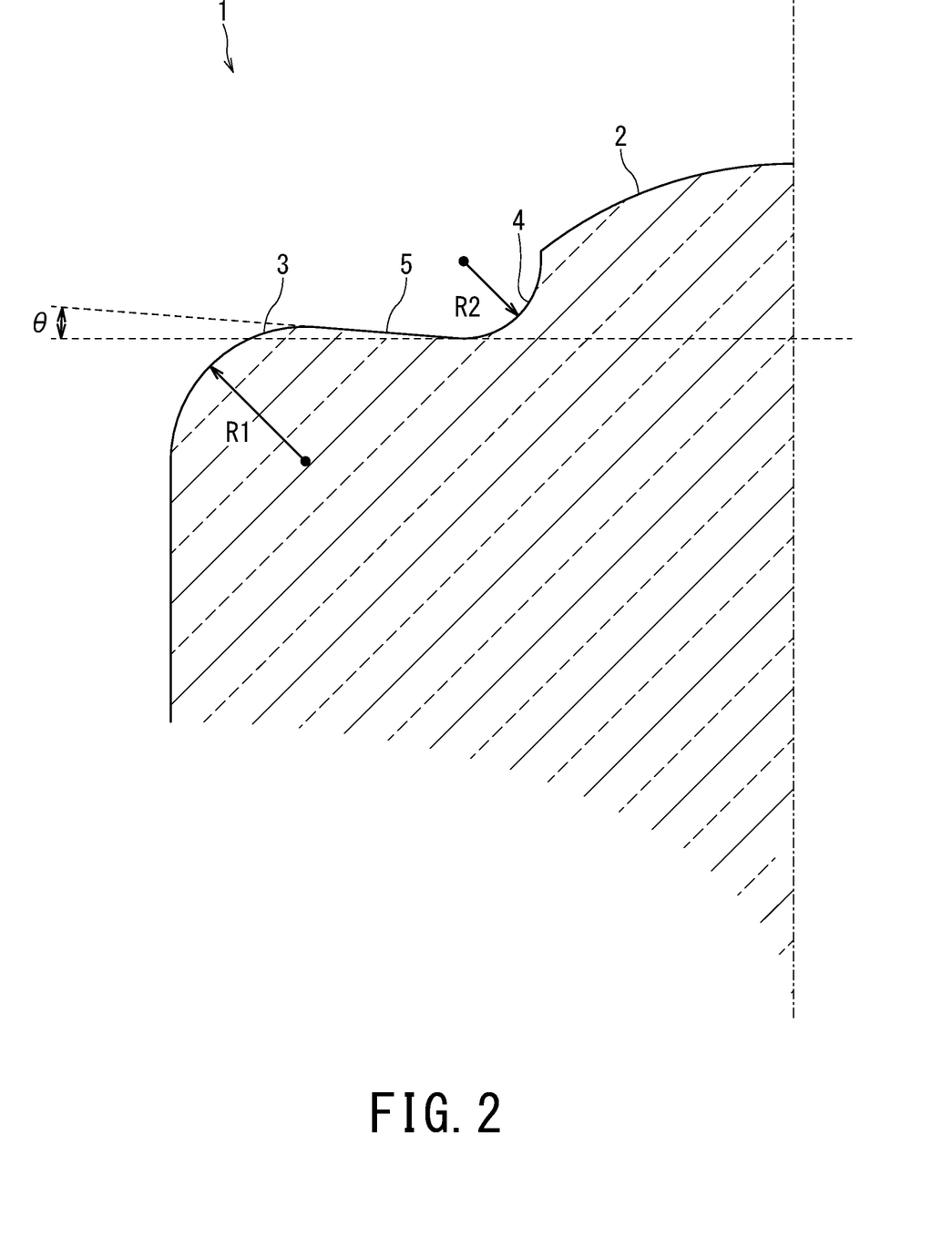
FIG. 2 is a cross-sectional view illustrating one case of an inclination angle of an inclined surface of the tool member.

Further, the tool member is preferably provided with an inclined surface from the end portion of the shoulder portion to the root portion of the probe portion. As shown in FIG. 2, this inclined surface is formed so as to descend from the end of the shoulder portion toward the center of the probe. That is, the inclined surface is arranged in such a manner that a concave portion is formed around the tip portion 2 of the probe. Thus, the horizontal direction of the probe and the inclined surface form a predetermined inclination angle θ.

In addition, the inclination angle θ of the inclined surface is preferably set to more than 0° and 10° or less. More preferably, the inclination angle θ of the inclined surface is 3° to 8°.

FIG. 2 illustrates a configuration of the inclined surface 5 extending from the end portion 3 of the shoulder portion to the root portion 4 of the probe portion. When a line is horizontally drawn from the lowermost part of the root portion 4 of the probe portion, the inclination angle θ of the inclined surface indicates the angle between this horizontal line (indicated by the broken line in FIG. 2) and the inclined surface 5.

When the inclined surface is provided, it is possible to prevent stress from concentrating on the root portion 4 of the probe portion during the friction stir welding. Additionally, since the end portion 3 of the shoulder portion is formed into a curved surface shape, the shoulder portion is prevented from being in line contact with the member to be welded. By forming the inclined surfaces 5 in combination, the durability of the tool member 1 can be improved.

Further, the inclination angle θ of the inclined surface is preferably set to more than 0° and 10° or less, and is more preferably in the range of 3° to 8°. When the inclination angle θ is larger than 10°, the end portion 3 of the shoulder portion tends to be in line contact with the member to be welded. In addition, when the inclination angle θ is 0° (horizontal), stress is likely to be applied to the root portion of the probe portion.

Further, the inclination angle θ of the inclined surface is preferably equal to or more than −10° and less than 0°, and is more preferably in the range of −3° to −8°. When the inclination angle θ of the inclined surface is smaller than −10°, stress is likely to be applied to the root portion of the probe portion. By setting the inclination angle θ of the inclined surface to be equal to or more than −10° and less than 0°, the probe portion can easily stir the member to be welded. Moreover, since the root portion of the probe portion is formed into a curved surface shape, the durability does not deteriorate even when the inclination angle is inclined in the minus direction.

As to the outer diameter W of the probe portion, it is preferable to satisfy W≤0.7D (mm) with respect to the outer diameter D of the shoulder portion. When the outer diameter W (mm) of the probe portion is close to the outer diameter D (mm) of the shoulder portion, the effect of providing the shoulder portion becomes small.

Further, it is preferable that the tip portion 2 of the probe portion has a curved surface shape. When the tip portion 2 of the probe portion has a spherical shape, the probe portion tends to easily enter the member to be welded during the friction stir welding. Additionally, when the tip portion 2 is a flat surface, a tip end portion of the tip portion 2 of the probe portion becomes a rectangular shape. When the tip end portion is a rectangular shape, cracking or chipping is liable to occur and its life is reduced. Thus, it is preferable that the tip portion of the probe portion has a curved surface shape.

The surface roughness Ra of the tip portion 2 of the probe portion is preferably set to 10 μm or less, and is more preferably 5 μm or less. The surface roughness Ra of the end portion 3 of the shoulder portion is also preferably 10 μm or less, and is more preferably 5 μm or less. When the surface roughness of the tip portion 2 of the probe portion and the end portion 3 of the shoulder portion is made small, it is possible to prevent the tool member from being broken due to contact with the member to be welded during the friction stir welding.

The surface roughness Ra is preferably set to 3 μm or less and further preferably 2.5 μm or less. The lower limit of the surface roughness Ra is not particularly limited, but is preferably set to 0.01 μm or more. When the surface roughness Ra is as small as 0.01 μm or less, the adhesion (close contacting property) between the tip portion 2 of the probe portion and the member to be welded is improved, but at the same time, the stirring force of the tip portion 2 of the probe portion is disadvantageously degraded.

Here, the stirring force of the tip portion 2 of the probe portion means the force to subject the welding member to plastic deformation (plastic flow). When the stirring force is insufficient, the mutual welding force (bonding strength) between the welding members is degraded. In addition, the plastic deformation of the welding member takes much time, and the welding time is probably elongated. Accordingly, the surface roughness Ra of the tip portion 2 of the probe portion is preferably set to 0.01 to 5 μm and is further preferably set to 0.05 to 2.5 μm.

In addition, it is preferable that the ceramic member is made of the silicon nitride sintered body having a Vickers hardness HV1 of 1400 HV1 or more. The Vickers hardness HV1 is set to a value measured at a load of 1 kg in accordance with a method prescribed in JIS-R1610.

The Vickers hardness HV1 is preferably set to 1400 or more, and is further preferably set to 1500 or more. Although the upper limit of the Vickers hardness is not particularly limited, it is preferably set to 1900 HV1 or less. When the Vickers hardness is higher than 1900 HV1, it is difficult to process the tool member into a curved surface shape. In consideration of processability, the Vickers hardness HV1 of the silicon nitride sintered body is preferably 1400 or more and 1900 or less, and is more preferably 1500 or more and 1700 or less.

In addition, the silicon nitride sintered body preferably contains 15% by mass or less of an additive component other than silicon nitride and the additive component preferably contains three or more elements selected from Y, a lanthanoid element, Al, Mg, Si, Ti, Hf, Mo, and C.

That is, the silicon nitride sintered body contains 15% by mass or less of an additive component. The additive component means a component other than silicon nitride. In the silicon nitride sintered body, an additive component other than silicon nitride means a sintering aid component. The sintering aid component constitutes the grain boundary phase. When the additive component exceeds 15% by mass excessively, the grain boundary phase becomes excessive. The silicon nitride sintered body adopts a structure in which elongated β-silicon nitride crystal grains are complicatedly intertwined. When the amount of the sintering aid component is increased, some portions cannot take a structure in which silicon nitride crystal grains are complicatedly intertwined, and thus increasing the amount of the sintering aid component is undesirable.

The amount of the additive component is preferably 3% by mass or more and 12.5% by mass or less. More preferably, the amount of the additive component is 5% by mass or more and 12.5% by mass % or less. When the additive component is less than 3% by mass, there is a possibility that an amount of the grain boundary phase becomes too small and the density of the silicon nitride sintered body decreases. When the additive component is regulated to 3% by mass or more, the relative density of the sintered body can be easily formed to be 95% or more. Further, by regulating the additive component to 5% by mass or more, the relative density of the sintered body can be easily formed to be 98% or more.

In addition, the additive component preferably includes three or more elements selected from the group consisting of Y, lanthanoid element, Al, Mg, Si, Ti, Hf, Mo, and C. The presence form of the additive component is not particularly limited, as long as the additive component includes Y (yttrium), the lanthanoid element, Al (aluminum), Mg (magnesium), Si (silicon), Ti (titanium), Hf (hafnium), Mo (molybdenum), and C (carbon) as the constituent elements thereof. For instance, the additive component includes oxides (inclusive of composite oxides), nitrides (inclusive of composite nitrides), oxynitrides (inclusive of composite oxynitrides), and carbides (inclusive of composite carbides). The lanthanoid element is preferably one selected from Yb (ytterbium), Er (erbium), Lu (ruthenium), and Ce (cerium).

As described hereinbelow, when the additive component is added as the sintering aid in the production process, oxides (inclusive of composite oxides), nitrides (inclusive of composite nitrides), and carbides (inclusive of composite carbides) are preferably used. In the case of the element Y, yttrium oxide ($Y_2O_3$) is preferable. As the lanthanoid element, one oxide selected from ytterbium oxide ($Yb_2O_3$), erbium oxide ($Er_2O_3$), ruthenium oxide ($Lu_2O_3$), and cerium oxide ($CeO_2$) is preferable.

In the case of the element Al, aluminum oxide ($Al_2O_3$), aluminum nitride (AlN), and $MgO \cdot Al_2O_3$ spinel are preferable. In the case of the element Mg, magnesium oxide (MgO) and $MgO \cdot Al_2O_3$ spinel are preferable. In the case of the element Si, silicon oxide ($SiO_2$) and silicon carbide (SiC) are preferable.

In the case of the element Ti, titanium oxide ($TiO_2$) and titanium nitride (TiN) are preferable. In the case of the element Hf, hafnium oxide ($HfO_2$) is preferable. In the case of the element Mo, molybdenum oxide ($MoO_2$) and molybdenum carbide ($Mo_2C$) are preferable. With regard to the element C, it is preferable to add the element C as silicon carbide (SiC), titanium carbide (TiC), or titanium carbonitride (TiCN). By adding two or more of these additive components in combination, it is possible to constitute a grain boundary phase including three or more elements selected from Y, the lanthanoid element, Al, Mg, Si, Ti, Hf, Mo and C. The additive component preferably includes four or more elements selected form Y, the lanthanoid element, Al, Mg, Si, Ti, Hf, Mo, and C.

As the combination of the sintering aids to be added in the production process, the following combinations are preferable.

As a first combination, MgO, $Al_2O_3$, SiC, and $SiO_2$ are added in contents of 0.1 to 1.7% by mass, 0.1 to 4.3% by mass, 0.1 to 10% by mass, and 0.1 to 2% by mass, respectively. Herewith, four elements, Mg, Al, Si, and C are included as the additive components. When MgO and $Al_2O_3$ are added, MgO and $Al_2O_3$ may be added as $MgO \cdot Al_2O_3$ spinel in a content of 0.2 to 6% by mass.

$TiO_2$ may be additionally added to the above-described first combination in a content of 0.1 to 2% by mass. The addition of $TiO_2$ to the first combination results in the inclusion of five elements, Mg, Al, Si, C, and Ti as the additive components.

As a second combination, $Y_2O_3$, $MgO \cdot Al_2O_3$ spinel, AlN, $HfO_2$, and $Mo_2C$ are added in contents of 0.2 to 3% by mass, 0.5 to 5% by mass, 2 to 6% by mass, 0.5 to 3% by mass, and 0.1 to 3% by mass, respectively. In the second combination, six elements, Y, Mg, Al, Hf, Mo, and C are added as the additive components.

In place of $Y_2O_3$, an oxide of the lanthanoid element may be used. In this case, six elements including the lanthanoid element, Mg, Al, Hf, Mo, and C are added.

As a third combination, $Y_2O_3$, AlN, and $HfO_2$ are added in contents of 2 to 7% by mass, 3 to 7% by mass, and 0.5 to 4% by mass, respectively. Herewith, three elements, Y, Al, and Hf are added as the additive components.

In place of $Y_2O_3$, an oxide of the lanthanoid element may be used. In this case, the additive components are three elements including the lanthanoid element, Al, and Hf.

In the first to third combinations, the upper limit of the total of the contents of the sintering aid components is set to 15% by mass or less.

In any of the first to third combinations, no combination adding both $Y_2O_3$ and $Al_2O_3$ is used. The first combination does not use $Y_2O_3$. The second combination includes $MgO \cdot Al_2O_3$ spinel as added therein. The third combination does not use $Al_2O_3$.

The sintering of the combination of $Y_2O_3$ and $Al_2O_3$ tends to form yttrium-aluminum oxides such as YAG ($Al_5Y_3O_{12}$), YAM ($Al_2Y_4O_9$), and YAL ($AlYO_3$). These yttrium-aluminum oxides are poor in heat resistance. The same holds true even when Y is replaced with the lanthanoid element. The friction stir welding tool member is subjected to a high temperature environment of 800° C. or higher in the temperature of the friction surface. The degradation of the heat resistance degrades the durability of the welding tool member.

The above-described additive components are also excellent in the role of the sintering aid. Accordingly, the proportion of the β-type silicon nitride crystal grains each having aspect ratio of 2 or more can be made as high as 60% or more. In order to determine the proportion of the β-type silicon nitride crystal grains having the aspect ratio of 2 or more, an arbitrary cross-section of the silicon nitride sintered body is observed with a SEM, and an enlarged photograph (magnification: 3000 times or more) of the cross-section is obtained. Next, the major axes (long diameter) and the minor axes (short diameter) of the silicon nitride crystal grains shown in the enlarged photograph are measured, and the aspect ratio is determined. The area proportion (%) (area ratio %) of the silicon nitride crystal grains of 2 or more in aspect ratio per a unit area of 50 μm×50 μm is determined.

In order to shorten the welding time of a member to be welded and to enhance the production efficiency, a friction stir welding apparatus preferably uses the welding tool member at a rotation speed of 300 rpm or more and with an indentation load of 9.8 kN (1 ton) or more. The frictional heat produces a high temperature environment of 800° C. or higher in the temperature of the friction surface. Accordingly, the tool member is required to have both heat resistance and wear resistance. Such a welding tool member made of a silicon nitride sintered body is required to have sufficient Vickers hardness and a sufficient fracture toughness value.

When the above-described additive components are added, the Vickers hardness of the silicon nitride sintered body can be attained to 1400 HV1 or more. In addition, the fracture toughness value of the silicon nitride sintered body is preferably 6.0 $MPa \cdot m^{1/2}$ or more. Further, the Vickers hardness can be 1500 HV1 or more and the fracture toughness value can be 6.5 $MPa \cdot m^{1/2}$ or more. Moreover, the three-point bending strength can be 900 MPa or more, and can further be 1000 MPa or more.

The friction stir welding tool member made of the above-described ceramic member is excellent in heat resistance and wear resistance (durability). Thus, even in a severe welding environment in which the rotational speed is 300 rpm or more and the indentation load is 9.8 kN (1 ton) or more, the friction stir welding tool member exhibits excellent durability. In the case of performing line bonding (line welding), the moving speed of the tool member can be set to 300 mm/min or more.

In addition, as a condition of the friction stir welding process, the rotational speed of the tool member is preferably set to a range from 300 rpm or more to 1000 rpm or less. When the rotation speed is less than 300 rpm, the stirring power may be insufficient. Conversely, when the rotation speed exceeds 1000 rpm, the stirring power becomes too strong and thereby the unevenness (irregularity) of the welded portion of the member to be welded becomes large. When the unevenness of the welded portion becomes large, the appearance deteriorates. Thus, the rotation speed is preferably controlled in the range of 300 to 1000 rpm, more preferably 400 to 800 rpm.

The indentation load is preferably set to 9.8 kN or more and 50 kN or less. When the indentation load is less than 9.8 kN, the stirring power becomes insufficient. In addition, when the indentation load exceeds 50 kN, there is a possibility that the life of the tool member is reduced. Thus, the indentation load is preferably set in the range of 14 kN or more and 35 kN or less.

In both cases of spot welding (point bonding) and line welding (line bonding), it is possible to realize the rotation speed in the above-described range and the indentation load in the above-described range. In the case of performing line welding, the moving speed of the tool member is preferably set to 300 mm/min or more and 1500 mm/min or less. When the moving speed is less than 300 mm/min, the speed is too slow and mass productivity declines. On the other hand, when the moving speed exceeds 1500 rpm, the stirring force partially decreases and the bonding strength between the materials to be welded decreases. Thus, the moving speed is preferably 300 to 1500 mm/min, and the moving speed is more desirably 400 to 1000 mm/min.

It should be noted that the welding tool member according to the embodiment may be used under the condition where the rotation speed is less than 300 rpm and the indentation load is less than 9.8 kN.

When the rotation speed of the tool member is defined as A (rpm) and the torque of the tool member is defined as B (kg·m), it is preferable that a ratio (B/A) is in the range of 0.001 to 0.025. Torque is expressed by the product of force and distance. The unit of torque is assumed to be kg·m. Additionally, 1 kg·m=9.8 N·m. The fact that B/A=0.001 to 0.025 means that the rotation speed A is sufficiently large with respect to the torque B. When the rotation speed is high, the stirring power (force) increases. It is possible to maintain a predetermined torque while the rotation speed is being maintained. Even when the tool member is used in such a way, the tool member can show excellent durability. Further, when B/A is in the range of 0.001 to 0.025, it is possible to form a defect-free welded portion.

It is assumed that the torque is calculated by using the servomotor, which rotates the tool material of the friction stir welding apparatus, as a torque calculator. The servomotor is a motor used for controlling the position, speed, and the like in the servomechanism. Namely, from a monitor output of a servo amplifier, a voltage of DC 0 V to DC 10 V is taken into an analog/digital conversion unit of a sequencer. Next, the analog voltage taken in by the internal computation of the sequencer is converted into a digital voltage. The torque is calculated by using the calculation formula that fits the operation pattern.

Even under the above-described conditions, the friction stir welding tool member according to the embodiment shows an excellent durability. In addition, the friction stir welding tool member exhibits excellent durability even under a severe welding environment where the temperature at the tip of the probe portion is 800° C. or higher.

Accordingly, the friction stir welding tool member is suitable for welding work in which the material to be welded is steel. Specific examples of steel may include iron alloys such as stainless steel, carbon steel, and high tensile strength steel. Steel is used for various products such as automobiles, railways, machine tools, and furniture. Since the friction stir welding is a welding method that does not use welding brazing material, it is effective for weight reduction of products and the like.

Steel having a thickness of 0.5 mm or more, more preferably 1 mm or more is used. In the friction stir welding, two or more materials to be welded are superimposed and welded (bonded), so that the upper limit of the thickness of the steel is preferably set to 3 mm or less. Thus, the above-described severe welding conditions are required. Since the friction stir welding tool member according to the embodiment is excellent in durability, it can be used under the above-described severe conditions.

Besides bonding in which materials to be welded are overlapped, the friction stir welding also includes a method of bonding target materials by butt welding. Additionally, a method of wire bonding or point bonding (spot welding) may be used. Further, it may be applied to a friction stir process (FSP) using friction stir. In other words, in the embodiment, a friction stir process (FSP) is included in the friction stir welding (FSW).

Further, in the friction stir welding process, if necessary, a backing material (backing plate) may be used. The backing material is preferably composed of a silicon nitride sintered body.

Next, a description will be given of a method for manufacturing the friction stir welding tool member according to the embodiment. Although the manufacturing method of the friction stir welding tool member according to the embodiment is not particularly limited as long as the friction stir welding tool member has the above-described configuration, the following method is included as a method for efficiently obtaining the tool member.

First, a ceramic sintered body is produced. The ceramic sintered body is preferably a silicon nitride sintered body. The silicon nitride sintered body preferably contains 15% by mass or less of additive components other than silicon nitride, and preferably contains three or more elements selected from Y, the lanthanoid element, Al, Mg, Si, Ti, Hf, Mo, and C as the additive components.

On the other hand, a silicon nitride powder is prepared. The silicon nitride powder is preferably an α-type silicon nitride powder having an average particle size of 2 μm or less. By using such a silicon nitride powder, the α-type silicon nitride powder is converted into the β-type in the sintering step, and thus the obtained sintered body is allowed to have a structure in which the β-type silicon nitride crystal grains are intricately intertwined. The content of the impurity oxygen in the silicon nitride powder is preferably 2% by mass or less.

Next, a sintering aid power is prepared as an additive component. The sintering aid powder is a combination including three or more elements selected from Y, the lanthanoid element, Al, Mg, Si, Ti, Hf, Mo, and C. The form of the addition includes one or more selected from an oxide powder (inclusive of composite oxides), a nitride powder (inclusive of composite nitrides), a carbide powder (inclusive of composite carbides) and a carbonitride (inclusive of composite carbonitrides). The total amount of the powders is specified to be 15% by mass or less. The average particle size of the sintering aid powder is preferably 3 μm or less. The preferable combinations of the sintering aid powders are the above-described first to third combinations.

Next, the silicon nitride powder and the sintering aid powder were mixed with each other in a ball mill to prepare a starting material powder. Next, an organic binder is added to the starting material powder, and the molding step is performed. In the molding step, a molding die having an intended probe shape may be used. Further, a molded body having a columnar shape or a quadrangular prism shape may be produced. For the molding step, a die molding method, a CIP (cold isostatic pressing) method, or the like may be used.

Next, the molded body obtained in the molding step is degreased. The degreasing step is preferably performed in nitrogen gas atmosphere at a temperature of 400 to 800° C. Further, the molded body may be processed so as to become close to the intended shape.

Next, the degreased molded body obtained in the degreasing step is sintered. The sintering step is performed at a temperature of 1600° C. or higher. The sintering step is preferably performed in an inert gas atmosphere or in vacuum. As the inert gas atmosphere, a nitrogen gas atmosphere and/or an argon gas atmosphere may be used. The sintering step may be performed under a normal pressure sintering method, a pressure sintering method, or a HIP (hot isostatic pressing) method. Additionally or alternatively, plural of the above sintering methods may be used in combination.

Further, the obtained silicon nitride sintered body is finally processed into a target shape, and polishing processing and/or electric discharge machining is preferable for this processing. The electric discharge machining is suitable for forming the curved surface shape of the root portion of the probe portion. In addition, it is preferable that a diamond grindstone is used for the polishing processing. The polishing processing using a diamond grinding stone is also suitable for adjusting the surface roughness of the tip portion of the probe portion and the end portion of the shoulder portion.

EXAMPLES

Examples 1 to 9 and Comparative Examples 1 to 3

A raw material mixed powder obtained by adding silicon nitride powder and sintering aid powder shown in Table 1 as a ceramic member was prepared. As the silicon nitride powder, a powder having an α-conversion rate of 95% or more and an average particle diameter of 1.2 μm was used. In addition, as the sintering aid powder, a powder having an average particle size of 0.7 to 2.0 μm was used.

TABLE 1

| | Additive Component | |
|---|---|---|
| Sample No. | Added Sintering Aid Powder (Mass %) | Total Amount of Sintering Aid Powder (Mass %) |
| Sample 1 | MgO•Al$_2$O$_3$ Spinel(5.5), SiO$_2$(0.5), SiC(4.5), TiO$_2$(0.8) | 11.3 |
| Sample 2 | Y$_2$O$_3$(2), MgO•Al$_2$O$_3$ Spinel(2), AlN(4), HfO$_2$(2), Mo$_2$C(1) | 11 |
| Sample 3 | Y$_2$O$_3$(4), AlN(4), HfO$_2$(2) | 10 |
| Sample 4 | Yb$_2$O$_3$(5), AlN(5), HfO$_2$(1.5) | 11.5 |
| Sample 5 | Y$_2$O$_3$(4), Al$_2$O$_3$(4), AlN(4), TiO$_2$(1.5) | 14.5 |
| Sample 6 | Y$_2$O$_3$(5), Al$_2$O$_3$(2), cBN(15) | 22 |

Next, the raw material mixed powder of each sample was mixed with a ball mill, and then an organic binder was mixed at 2% by mass. Next, metal molding was performed. Next, each sample was subjected to a normal pressure sintering in a nitrogen atmosphere at a temperature of 1800° C. for 5 hours. Thereafter, HIP sintering was performed at a temperature of 1700° C. for 2 hours. As a result, silicon nitride sintered bodies according to the samples 1 to 6 were produced.

Vickers hardness, a fracture toughness value and three-point bending strength of thus obtained silicon nitride sintered bodies were measured. Vickers hardness HV1 was tested in accordance with JIS-R 1610 at a load of 1 kg. In addition, the fracture toughness value was measured in accordance with JIS-R-1607 and was calculated on the basis of an IF method by using Niihara's equation. Additionally, the three-point bending strength was measured in accordance with JIS-R-1601. The results are shown in Table 2 hereinbelow.

TABLE 2

| Sample No. | Vickers Hardness (HV1) | Fracture Toughness Value (MPa · m$^{1/2}$) | Three-Point Bending Strength (MPa) |
|---|---|---|---|
| Sample 1 | 1520 | 7.0 | 930 |
| Sample 2 | 1450 | 6.9 | 920 |
| Sample 3 | 1500 | 6.8 | 970 |
| Sample 4 | 1550 | 6.8 | 980 |
| Sample 5 | 1450 | 6.5 | 1020 |
| Sample 6 | 1700 | 7.0 | 830 |

Next, each sample was processed to prepare a tool member. For the tool member, the outer diameter D of the shoulder portion was unified to 20 mm and the outer diameter W of the probe portion was unified to 10 mm. Further, in each of the Examples and Comparative Examples 1 and 2, the tip portion of the probe portion was formed into a curved surface shape. The other shapes are as shown in Table 3, and the end portion of the shoulder portion and the root portion of the probe portion were formed into a curved surface shape (refer to FIG. 1). For obtaining the curved surface shape, electric discharge machining was performed.

As to the Comparative Example 3, a silicon nitride sintered body of the Example 1 was used such that the Comparative Example 3 was prepared as a sample in which the end portion of the shoulder portion and the root portion of the probe portion were formed in a right angle shape.

In the tool member according to each of the Examples and the Comparative Examples, the surface roughness Ra of the end portion of the shoulder portion and the tip end portion of the probe portion was unified to 2 μm. Additionally, the surface roughness was adjusted by the polishing processing with the use of the diamond grindstone.

TABLE 3

| Sample No. | Silicon Nitride Sintered Body | Surface Shape of Probe Portion | Shape of Root Portion of Probe Portion | Curvature Radius of Root Portion of Probe Portion R2 (mm) | Shoulder Portion Shape of End Portion | Shoulder Portion Curvature Radius of End Portion R1 (mm) | Shoulder Portion R1/D | Inclination Angle from End Portion of Shoulder Portion to Root Portion of Probe Portion θ (°) |
|---|---|---|---|---|---|---|---|---|
| Example 1 | Sample 1 | Curved Surface | Curved Surface | 1.0 | Curved Surface | 1.0 | 0.05 | 8 |
| Example 2 | Sample 1 | Curved Surface | Curved Surface | 0.5 | Curved Surface | 0.4 | 0.02 | 1 |
| Example 3 | Sample 2 | Curved Surface | Curved Surface | 0.8 | Curved Surface | 2.0 | 0.10 | 3 |
| Example 4 | Sample 3 | Curved Surface | Curved Surface | 1.2 | Curved Surface | 3.0 | 0.15 | 5 |
| Example 5 | Sample 4 | Curved Surface | Curved Surface | 1.3 | Curved Surface | 3.0 | 0.15 | 5 |
| Example 6 | Sample 4 | Curved Surface | Curved Surface | 1.5 | Curved Surface | 0.8 | 0.04 | 13 |
| Example 7 | Sample 2 | Curved Surface | Curved Surface | 0.7 | Curved Surface | 2.0 | 0.10 | -3 |
| Example 8 | Sample 3 | Curved Surface | Curved Surface | 1.1 | Curved Surface | 3.0 | 0.15 | -8 |
| Example 9 | Sample 4 | Curved Surface | Curved Surface | 1.3 | Curved Surface | 0.9 | 0.05 | -13 |
| Comparative Example 1 | Sample 5 | Curved Surface | Curved Surface | 0.01 | Curved Surface | 0.2 | 0.01 | 0 (Flat) |
| Comparative Example 2 | Sample 6 | Curved Surface | Curved Surface | 0.01 | Curved Surface | 4.6 | 0.23 | 0 (Flat) |
| Comparative Example 3 | Sample 1 | Curved Surface | Right Angle | — | Right Angle | — | — | 0 (Flat) |

Next, the friction stir welding tool member according to each Example and Comparative Example was installed in the friction stir welding apparatus. Two sheets of stainless steel (thickness 1.5 mm) were prepared as a material to be welded. Under the two line welding conditions for friction stir welding shown in Table 4, the friction stir welding was performed. After the friction stir welding was performed up to a line welding length of 10 m, the presence/absence of breakage of the probe portion or the shoulder portion and the wear amount of the shoulder portion of the tool member were measured. In the test, a backing plate (material) made of a silicon nitride sintered body was used.

The presence/absence of breakage of the probe portion or shoulder part was visually confirmed. In addition, the wear amount of the shoulder portion of the tool member was obtained by measuring the tool member subjected to the test with the use of a laser-type three-dimensional shape measurement device. The results are shown in Table 5 hereinbelow.

TABLE 4

| Sample No. | Test Condition 1 | Test Condition 2 |
|---|---|---|
| Rotation Speed (rpm) | 500 | 800 |
| Moving Speed (mm/min) | 400 | 800 |
| Indentation Load (kN) | 19.6 | 29.4 |

TABLE 5

| | Test Condition 1 | | Test Condition 2 | |
|---|---|---|---|---|
| Sample No. | Presence/Absence of Damage in Probe Portion or Shoulder Portion | Wear Amount of Soulder Portion of Tool Member (μm) | Presence/Absence of Damage in Probe Portion or Shoulder Portion | Wear Amount of Soulder Portion of Tool Member (μm) |
| Example 1 | None | 150 | None | 420 |
| Example 2 | None | 370 | Observed | — |
| Example 3 | None | 130 | None | 310 |
| Example 4 | None | 100 | None | 230 |
| Example 5 | None | 110 | None | 240 |
| Example 6 | None | 460 | Observed | — |
| Example 7 | None | 180 | None | 340 |
| Example 8 | None | 230 | None | 370 |
| Example 9 | None | 450 | Observed | — |
| Comparative Example 1 | Observed | — | Observed | — |
| Comparative Example 2 | Observed | — | Observed | — |

TABLE 5-continued

| | Test Condition 1 | | Test Condition 2 | |
|---|---|---|---|---|
| Sample No. | Presence/Absence of Damage in Probe Portion or Shoulder Portion | Wear Amount of Soulder Portion of Tool Member (μm) | Presence/Absence of Damage in Probe Portion or Shoulder Portion | Wear Amount of Soulder Portion of Tool Member (μm) |
| Comparative Example 3 | Observed | — | Observed | — |

As is clear from the results shown in Table 5, the tool members according to the respective Examples showed excellent performance. In particular, the wear amount was small in the tool member that has R1/D ratio of 0.05 to 0.15, R1 of 1.2 to 2.2 mm, R2 of 0.1 mm or more, and an inclined surface angle of 3° to 8°. In addition, the wear amount was also small in the tool member that has the inclined surface angle of −3° to −8°. Thus, it has been confirmed that the angle of the inclined surface is preferably set to the range more than 0° and equal to or less than 10° or in the range equal to or more than −10° and less than 0°. On the other hand, in each of the Comparative Examples 1 to 3, the tool member was damaged during the friction stir welding test, and failed to withstand the bonding (welding) length of 10 m. These results show that the durability of the tool member is improved by optimizing the shape thereof even if the same material is used.

Examples 1A to 9A

Next, a friction stir welding was performed on the tool members according to the Examples 1 to 9 by changing the rotation speed and torque. The friction stir welding was performed under the conditions of the rotation speed A (rpm) and torque B (kg·m) shown in Table 6. Two sheets of stainless steel (thickness 1.0 mm) were prepared as materials to be welded.

In addition, the presence or absence of defects at the welded portion was measured after welding. By observing the cross-section of the welded portion by means of a metallurgical microscope, the presence/absence of defects at the welding portion was determined on the basis of the presence/absence of holes (junction defects) having a diameter of 0.2 mm or more. The results are shown in Table 6 hereinbelow.

TABLE 6

| Sample No. | Tool Member | Rotation Speed (rpm) | Torque B (kg · m) | | |
|---|---|---|---|---|---|
| | | | 2~4 | 5~7 | 8~10 |
| Example 1A | Example 1 | 400 | No Defect | No Defect | No Defect |
| Example 2A | Example 2 | 500 | No Defect | No Defect | Defect was Observed |
| Example 3A | Example 3 | 600 | No Defect | No Defect | No Defect |
| Example 4A | Example 4 | 700 | No Defect | No Defect | No Defect |
| Example 5A | Example 5 | 800 | No Defect | No Defect | No Defect |
| Example 6A | Example 6 | 500 | No Defect | No Defect | Defect was Observed |
| Example 7A | Example 7 | 600 | No Defect | No Defect | No Defect |
| Example 8A | Example 8 | 700 | No Defect | No Defect | No Defect |
| Example 9A | Example 9 | 800 | No Defect | No Defect | Defect was Observed |

As is apparent from the results shown in Table 6, in the case of using the respective tool members of the examples 1, 3, 4, 5, 7, and 8 that satisfy the preferable range, welding without a defect was obtained within a range of B/A=0.001 to 0.025. Those cases were observed by means of a metallurgical microscope (magnification: 2000 times) and defects of less than 0.2 mm were not found either. Thus, both of durability and welding quality are achieved in those Examples.

On the other hand, in the case of using a tool member which is out of the preferable range like the Example 2 (R1=0.4 mm), the Example 6 (inclination angle is 13°), and the Example 9 (inclination angle)−13°, a defect occurred when torque became larger.

Torque is the quantity (moment) expressed as the product of force and distance. Torque is inversely proportional to the distance from the center of the rotation axis. That is, in the tip portion of the tool member, the force to be applied is different between the rotating shaft and the shoulder portion. By performing friction stir welding with the use of the tool member according to the embodiment in the range in which B/A is 0.001 to 0.025, welding without defects can be realized. In other words, it can be said that the tool member according to the embodiment is suitable for friction stir welding under the condition where B/A=0.001 to 0.025.

Several embodiments of the present invention are illustrated above. However, these embodiments are presented by way of example only and not intended to limit the scope of the invention. These novel embodiments can be implemented in other various forms. Various omissions, substitutions, alterations, and the like of the embodiments can be made without departing from the gist of the invention. These embodiments and modifications thereof are included in the scope and the gist of the present invention and included in the inventions described in claims and a scope of equivalents of the present inventions. The embodiments described above can be implemented in combination with one another.

REFERENCE SIGNS LIST 1 friction stir welding tool member
2 tip portion of the probe portion
3 end portion of the shoulder portion
4 root portion of the probe portion
5 inclined surface
W outer diameter of the probe portion
D outer diameter of the shoulder portion
θ inclination angle of the inclined surface

The invention claimed is:
1. A friction stir welding tool member made of a ceramic member in which a shoulder portion and a probe portion are integrally formed,
   a root portion of the probe portion and an end portion of the shoulder portion have a curved surface shape, the friction stir welding tool member has a ratio (R1/D) of 0.02 or more and 0.20 or less, when a curvature radius of the end portion of the shoulder portion is defined as R1 (mm) and an outer diameter of the shoulder portion is defined as D (mm), the ceramic member is a silicon nitride sintered body having an area ratio (%) of 60% or more of silicon nitride crystal particles having an aspect ratio of 2 or more per unit area of 50 µm×50 µm, the silicon nitride sintered body contains, by mass, 15% or less of additive components other than silicon nitride in such a manner that the additive components include at least three elements selected from Y, a lanthanoid element, Al, Mg, Si, Ti, Hf, Mo, and C, and an inclination angle (θ) of an inclined surface with respect to a direction perpendicular to an axis of the probe portion is: (i) larger than 0° and equal to or less than 10°, or (ii) equal to or larger than −10° and less than 0°, the inclined surface being provided from the end portion of the shoulder portion to the root portion of the probe portion.

2. The friction stir welding tool member according to claim 1, wherein the ceramic member is made of a silicon nitride sintered body having a Vickers hardness of 1400 HV1 or more.

3. The friction stir welding tool member according to claim 1, wherein a curvature radius R2 (mm) of the root of the probe portion is 0.1 mm or more.

4. The friction stir welding tool member according to claim 1, wherein the inclination angle θ of the inclined surface with respect to a direction perpendicular to an axis of the probe portion is equal to or larger than −10° and less than 0°.

5. The friction stir welding tool member according to claim 1, wherein a tip portion of the probe portion has a curved surface shape.

6. The friction stir welding tool member according to claim 1, wherein a surface roughness Ra of a curved surface portion formed at the end portion of the shoulder portion is 10 µm or less.

7. A friction stir welding apparatus equipped with the friction stir welding tool member according to claim 1.

8. A friction stir welding method in which the friction stir welding apparatus according to claim 7 is used, the friction stir welding method comprising:

superimposing two or more materials to be welded each other; and pressing the friction stir welding tool member against the materials to be welded while the friction stir welding tool member is being rotated at a rotation speed of 300 rpm or more.

9. The friction stir welding method according to claim 8, wherein the materials to be welded are steel.

10. The friction stir welding tool member according to claim 1, wherein:

a curvature radius R2 (mm) of the root of the probe portion is 0.1 mm or more.

11. The friction stir welding tool member according to claim 1, wherein:

the ceramic member is made of a silicon nitride sintered body having a Vickers hardness of 1400 HV1 or more; and a curvature radius R2 (mm) of the root of the probe portion is 0.1 mm or more.

12. The friction stir welding tool member according to claim 1, wherein:

a surface roughness Ra of a curved surface portion formed at the end portion of the shoulder portion is 10 µm or less; and a curvature radius R2 (mm) of the root of the probe portion is 0.1 mm or more.

\* \* \* \* \*